United States Patent Office 3,455,831
Patented July 15, 1969

3,455,831
IMINES CONTAINING A POLYALKENYLSUCCINIC ANHYDRIDE SUBSTITUENT
James B. Davis, Kirkwood, Mo., assignor to Monsanto Company, St. Louis, Mo., a corporation of Delaware
No Drawing. Filed Sept. 27, 1963, Ser. No. 311,999
Int. Cl. C10m 1/32
U.S. Cl. 252—51.5        20 Claims This invention relates to new imines useful as detergents in lubricating oil compositions.

Under the conditions encountered in a large percentage of present-day automobile driving (i.e., the so-called stop-and-go driving), automobile engines do not attain their most desirable and efficient operating temperatures. As a result, large quantities of undesirable products are formed which eventually find their way into the crankcase where they tend to deposit on the internal parts of the engine resulting in further inefficient engine operation. In present-day practice, deposition of such products is minimized by incorporating into lubricating oils metal-containing detergents. The use of metal-containing detergents, however, has not been totally satisfactory since such detergents may form ash deposits in the combustion chambers of engines, fouling the spark plugs and creating other problems and, accordingly, it is the desire of those working in the art to find suitable detergents which are metal-free or ashless.

It has now been found that certain imines, or Schiff bases, are useful as metal-free or ashless detergents in lubricating oil compositions and especially where such compositions are used at relatively low temperatures. The imines which are the subject of the present invention can be represented by the structure $$\begin{array}{c} O \\ \parallel \\ R-CH-C \\ | \quad\quad\quad\quad N-A-N=C \\ CH_2-C \\ \parallel \\ O \end{array} \begin{array}{c} R_1 \\ \\ R_2 \end{array}$$

where R is a polyalkenyl radical having a molecular weight of from about 500 to about 2500, preferably about 800 to about 1500; $R_1$ and $R_2$ are selected from the group consisting of hydrogen, an alkyl, alkenyl or haloalkyl radical each of which can contain from one to twenty carbon atoms, a phenyl, a naphthyl or a furfuryl radical; and A is selected from (I)    $(CH_2)_x$ (II)   $(NH)_n-\overset{Z}{\underset{\parallel}{C}}-(NH)_w$ and (III)  $\overset{Z}{\underset{\parallel}{C}}-NH-\overset{Z}{\underset{\parallel}{C}}$ in which in (I) $x$ is a whole number from one to six; in (II) $n$ is 0 or 1, $w$ is 0 or 1, but the sum of $n$ and $w$ is from 1 to 2, Z is selected from oxygen and NH; and in (III) Z is selected from oxygen and NH but at least one Z is NH.

The imines of this invention can be prepared by reacting (a) a polyalkenylsuccinic anhydride represented by the structure $$\begin{array}{c} O \\ \parallel \\ R-CH-C \\ | \quad\quad\quad\quad\quad O \\ CH_2-C \\ \parallel \\ O \end{array}$$

or the acid thereof, with (b) a polyamine represented by the structure $$NH_2-A-NH_2$$

to produce an intermediate product, an imide, represented by the structure $$\begin{array}{c} O \\ \parallel \\ R-CH-C \\ | \quad\quad\quad\quad N-A-NH_2 \\ CH_2-C \\ \parallel \\ O \end{array}$$

which is then reacted with (c) a carbonyl-containing compound, that is, an aldehyde or a ketone, represented by the structure $$\begin{array}{c} O \\ \parallel \\ R_1-C-R_2 \end{array}$$

where R, $R_1$, $R_2$ and A have their aforedescribed significance. The mol ratios of (a):(b):(c) which are used are about 1:1:1, respectively.

The polyalkenylsuccinic anhydrides or acids useful in preparing the imines of this invention can be prepared from an olefin or olefin polymer and maleic anhydride. Preferably a polymer of a lower olefin or a copolymer of lower olefins is used, for example, polymers of ethylene, propylene, butylene, isobutylene and copolymers or mixtures thereof, having a molecular weight of from about 500 to about 2500, but preferably about 800 to about 1500. The preparation of the polyalkenylsuccinic anhydrides is best effected at temperatures of the order of about 150° C. to 250° C. by reacting maleic anhydride with the olefin polymer in mol ratios of from 1:1 to about 5:1, respectively. Since the reaction between the olefin and maleic anhydride may not go to completion, the resulting polyalkenylsuccinic anhydride can contain some unreacted olefin which can be allowed to remain as a diluent with no harmful effects upon the performance of the compounds of this invention.

The polyamines useful in preparing the imines of this invention wherein A is (I) are methylenediamines having from one to six methylene groups between the terminal nitrogen atoms; i.e., methylene diamine, ethylene diamine, trimethylene diamine, tetramethylenediamine (putrescine), pentamethylene diamine (cadaverine), and hexamethylenediamine.

The polyamines used in preparing the compounds of this invention where A is (II) are urea, guanidine, semicarbizide and aminoguanidine; and where A is (III) guanylurea, 1,3-diaminourea, 1,3-diaminoguanidine or biguanide are used.

The carbonyl-containing compounds useful in preparing the imines of this invention can be an aldehyde or a ketone, as mentioned above, and they can be aliphatic or aromatic. Typical examples of aliphatic aldehydes where $R_1$ is hydrogen, an alkyl, alkenyl or haloalkyl radical and $R_2$ is hydrogen are formaldehyde, acetaldehyde, propionaldehyde, n-butyraldehyde, isobutyraldehyde, n-valeraldehyde, isovaleraldehyde, pivaldehyde, caproaldehyde, pelagonaldehyde, capraldehyde, lauraldehyde, myristaldehyde, stearaldehyde, and the like; substituted aldehydes such as chloroacetaldehyde, chloral, butylchloral, trifluoroacetaldehyde, aldol, and the like; and unsaturated aldehydes such as 2- and 3-butenal, 2-propenal, 2-methyl, 2-propenal, 3- and 4-pentenal, 3-,4- and 5-hexenal, 2-ethyl-3-hexenal, 3-decenal, and the like.

Representative examples of aromatic aldehydes where $R_1$ is a phenyl radical and $R_2$ is hydrogen are benzaldehyde;
alkylsubstituted benzaldehyde, e.g.,
2-, 3- and 4-methylbenzaldehyde,
2,6- and 3,5-dimethylbenzaldehyde,
2-, 3- and 4-ethylbenzaldehyde, 4-isopropylbenzaldehyde,
2-isobutylbenzaldehyde;
4-octylbenzaldehyde,
2,3,6-, 2,4,6- and 2,4,5-trimethylbenzaldehyde,
2,3,5,6-tetramethylbenzaldehyde;
2-hydroxy-5-methylbenzaldehyde;
halogen-substituted benzaldehyde, e.g.,
2-fluorobenzaldehyde,
2-, 3- and 4-chlorobenzaldehyde,
2-, 3- and 4-bromobenzaldehyde,
3-iodobenzaldehyde,
3,4-dichlorobenzaldehyde,
2,3,5-trichlorobenzaldehyde,
pentachlorobenzaldehyde,
2-trifluoromethylbenzaldehyde;
alkoxy-substituted benzaldehyde, e.g.,
2- and 3-methoxybenzaldehyde,
4-methoxybenzaldehyde (anisaldehyde),
2-, 3- and 4-ethoxybenzaldehyde,
2,3- and 3,4-dimethoxybenzaldehyde,
4-hydroxy-3-methoxybenzaldehyde (vanillin),
3-ethoxy-4-hydroxybenzaldehyde,
3,4,5-trimethoxybenzaldehyde,
4-methoxy-3-hydroxybenzaldehyde (isovanillin);
hydroxy-substituted benzaldehyde, e.g.,
2-hydroxybenzaldehyde (salicylaldehyde),
4-hydroxybenzaldehyde,
2-hydroxy-4-chlorobenzaldehyde,
3-ethyl-4-hydroxybenzaldehyde,
2,6- and 3,5-dihydroxybenzaldehyde,
2,4,6-trihydroxybenzaldehyde.

Other substituents can include nitro, as in
2-nitrobenzaldehyde; amino as in
2-aminobenzaldehyde and 4-diethylaminobenzaldehyde;
benzyloxy, as in
3-benzyloxybenzaldehyde; carboxyl, as in
benzaldehyde-2-carboxylic acid and 2-hydroxybenzaldehyde-3-carboxylic acid; phenoxy, as in
2-phenoxybenzaldehyde; vinyl, as in
2-vinylbenzaldehyde; and cyano, as in
2-cyanobenzaldehyde.

In the case where $R_1$ is a naphthyl radical and $R_2$ is hydrogen typical starting aldehydes are for example 1- and 2-naphthaldehyde,
4-methoxy-1-naphthaldehyde,
1-hydroxy-2-naphthaldehyde,
4-phenyl-2-naphthaldehyde, and the like.

Where $R_1$ is a furfuryl radical and $R_2$ is hydrogen starting aldehydes include
2- and 3-furfuraldehyde,
5-methylfurfuraldehyde,
5-hydroxy-2-furfuraldehyde, and the like.

Typical examples of aliphatic ketones, that is where $R_1$ and $R_2$ is an alkyl, alkenyl or haloalkyl radical are
acetone,
methyl ethyl ketone,
methyl propyl ketone,
methyl isopropyl ketone,
methyl butyl ketone,
methyl isobutyl ketone,
methyl sec.-butyl ketone,
methyl tert.-butyl ketone,
methyl cyclobutyl ketone,
cyclohexanone,
methyl neopentyl ketone,
methyl tert.-amyl ketone,
methyl n-amyl ketone,
methyl hexyl ketone,
methyl cyclohexyl ketone,
methyl n-heptyl ketone,
methyl n-octyl ketone,
methyl nonyl ketone,
methyl decyl ketone,
diethyl ketone,
di-n-propyl ketone,
diisopropyl ketone,
ethyl isopropyl ketone,
ethyl isobutyl ketone,
ethyl n-propyl ketone,
ethyl tert.-butyl ketone,
ethyl n-butyl ketone,
tert.-butyl isopropyl ketone,
n-propyl isopropyl ketone,
diisobutyl ketone,
hendecyl pentyl ketone,
dodecyl pentyl ketone,
tetradecyl hexyl ketone,
tetradecyl isobutyl ketone,
hexadecyl octyl ketone,
nonodecyl nonal ketone,
nonodecyl hexadecyl ketone,
dinonodecyl ketone,
dioctadecyl ketone,
3- and 4-methyl-2-hexanone,
3,4-dimethyl-2-pentanone,
3-ethyl-2-pentanone,
2-ethyl-2-decanone,
6-methyl-7-octadecanone,
5,7-dimethyl-9-heneicosanone; and the like;
substituted ketones such as
1-chloro-2-propanone,
2-chloro-3-pentanone,
1,2-dichloro-3-pentanone,
1-bromo-7-nitro-4-heptanone,
1-chloro-7-octadecanone, and the like;
unsaturated ketones such as
vinyl methyl ketone,
vinyl ethyl ketone,
2- and 3-methyl-1-penten-4-one,
1-hepten-4-one,
3-methyl-1-hexen-5-one,
4-methyl-5-hexen-2-one,
5-methyl-6-nonadecen-2-one, and the like.

In the case where $R_1$ is a phenyl radical and $R_2$ is an alkyl, alkenyl or haloalkyl radical typical starting ketones are acetophenone, propiophenone, butyrophenone, pelargonophenone, capriphenone, hendecanophenone, arachidophenone, acrylophenone, crotonophenone, chalcone, benzoin, p - bromo - acetophenone, p - chloroacetophenone, p - bromo - alpha - chloroacetophenone, and the like. Where both $R_1$ and $R_2$ are phenyl radicals starting ketones include benzophenone,
4,4'-bis(dimethylamino)benzophenone,
4-methyl benzophenone,
4,4'-dimethyl benzophenone,
2-, 3- and 4-hydroxy benzophenone,
4,4'-dihydroxy benzophenone,
4,4'-dichloro benzophenone,
2-, 3- and 4-chloro benzophenone,
2-, 3- and 4-bromo benzophenone, and the like.

Where $R_1$ is a phenyl radical and $R_2$ is a naphthyl radical typical starting ketones are 1- and 2-naphtyl phenyl ketone,
1-methyl-2-naphthyl phenyl ketone,
3-methyl-2-naphthyl phenyl ketone,
2,3-dimethyl-1-naphthyl phenyl ketone,
1-naphthyl 2-methyl-1-phenyl ketone,
1-naphthyl 2-chloro-1-phenyl ketone, and the like.

Where $R_1$ is a phenyl radical and $R_2$ is a furfuryl radical starting ketones are 2-methyl-1-phenyl furfuryl ketone,
2,3-dimethyl-1-phenyl furfuryl ketone, and the like.

When $R_1$ is a naphthyl radical and $R_2$ is an alkyl, alkenyl or haloalkyl radical typical starting ketones are 1-naphthyl methyl ketone,
1-naphthyl ethyl ketone, 2-naphthyl propyl ketone,
2-naphthyl octyl ketone,
1-naphthyl nonyl ketone,
1-naphthyl octadecyl ketone,
1-naphthyl 2-chlorooctyl ketone,
1-naphthyl 2-butenyl ketone,
1-naphthyl 3-pentenyl ketone,
1-naphthyl 4-octadecenyl ketone,
2-chloro-1-naphthyl decyl ketone,
2,3-dibromo-1-naphthyl dodecyl ketone, and the like.

Where $R_1$ and $R_2$ are naphthyl radicals typical ketones are 1-naphthyl ketone,
2-naphthyl ketone,
2-methyl-1-naphthyl 1-naphthyl ketone,
4-methoxy-1-naphthyl 1-naphthyl ketone,
2-chloro-1-naphthyl 3-chloro-1-naphthyl ketone, and the like. Where $R_1$ is an naphthyl radical and $R_2$ is a furfuryl radical typical starting ketones are 1-naphthyl furfuryl ketone,
2-methyl-1-naphthyl furfuryl ketone,
2-chloro-1-naphthyl furfuryl ketone,
3-chloro-1-naphthyl furfuryl ketone,
4-methoxy-1-naphthyl furfuryl ketone and the like.

In the case where $R_1$ is a furfuryl radical and $R_2$ is an alkyl, alkenyl or haloalkyl radical typical ketones are furfuryl methyl ketone, furfuryl octyl ketone, furfuryl dodecyl ketone, furfuryl 2-butenyl ketone, furfuryl 4-dodecyl ketone, furfuryl 2 - butenyl ketone, furfuryl 4-dodecenyl ketone, furfuryl chloroethyl ketone and the like. Where $R_1$ and $R_2$ are both furfuryl radicals, an example of a starting ketone is difurfuryl ketone.

The various imides resulting from the first step in the preparation of the imines of the present invention can be, as heretofore mentioned, represented by the structure

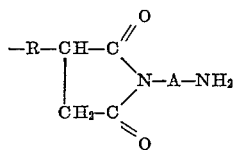

where R and A have their aforedescribed significance. These imides can be prepared by heating a mineral oil, toluene or other hydrocarbon solution of a polyalkenylsuccinic anhydride and a polyamine at temperatures of the order of about 50° C. to about 200° C., using mol ratios of anhydride to polyamine of about 1:1 while at the same time continuously removing the water formed from the reaction.

It is thus evident that suitable imides prepared as heretofore explained are polyalkenylsuccinimidoalkylamines where A is $(CH_2)_x$; carbamoylpolyalkenylsuccinimides, amidinopolyalkenylsuccinimides, guanidinopolyalkenylsuccinimides or ureidopolyalkenylsuccinimides where A is

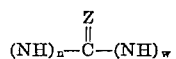

and 1-amino - 3 - polyalkenylsuccinimidoureas, 1-amino-3-polyalkenylsuccinimidoguanidines, guanylamidinopolyalkenylsuccinimides or carbamoylamidinopolyalkenylsuccinimides where A is

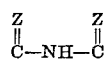

Typical examples of the imides used to prepare the imines of this invention are given below. In naming the imides and imines herein, the approximate molecular weight of the polyalkenyl chain is denoted by the number in parentheses after the name of the polyalkenyl group in a particular compound:

polybutenyl(700)succinimidomethylamine,
2-[polypropenyl(1200)succinimido]ethylamine,
3-[polybutenyl(980)succinimido]propylamine,
4-[polyethenyl(1500)succinimido]butylamine,
5-[polybutenyl(1300)succinimido]pentylamine,
6-[polybutenyl(1500)succinimido]hexylamine,
N-carbamoylpolybutenyl(1350)succinimide,
N-amidinopolybutenyl(900)succinimide,
N-(N-carbamoylamidino)polybutenyl(980)succinimide,
N-(guanidino)polybutenyl(1200)succinimide,
N-(ureido)polybutenyl(900)succinimide,
1-amino-3-polybutenyl(1300)succinimidourea,
1-amino-3-polybutenyl(1350)succinimidoguanidine,
N-(N-guanylamido)polybutenyl(980)succinimide, and the like.

The imides, as described above, are then reacted with a carbonyl-containing compound in mineral oil or a hydrocarbon solvent at temperatures of the order of about 50° C. to about 200° C., using mol ratios of imide to carbonyl-containing compound of about 1:1, respectively, while continuously removing the water formed from the reaction. Typical examples of the imines of this invention are N-ethylidene polybutenyl(700)succinimidomethylamine
N-propylidene polypropenyl(1800)succinimidomethylamine
N-undecylidene-6-[polybutenyl(900)succinimido]hexamethylamine
N-butyl-2-idene-4-[polypropenyl(1300)succinimido]tetramethylamine
N-(2-chloropentylidene)-5-[polybutenyl(1500)succinimido]pentylamine
N-(4-bromohexyl-3-lidene)-2[polypropenyl(1000)succinimido]ethylamine
N-benzylidene polyethylenyl(1000)succinimidomethylamine
N-benzylidene-2-[polypropenyl(900)succinimido]ethylamine
N-furfurylidene-2-[polypropenyl(900)succinimido]ethylamine
N-benzylidene-3-[polypropenyl(900)succinimido]propylamine
N-naphthylidene-4-[polypropenyl(900)succinimido]butylamine
N-(3-methylbenzylidene)-5-[polybutenyl(900)succinimido]pentylamine
N-furfurylidene-5-[polybutenyl(900)succinimido]pentylamine
N-(4-hydroxybenzylidene)-6-[polybutenyl(1500)succinimido]hexylamine.

The preparation of the imines of this invention is illustrated in the following non-limiting detailed examples, wherein parts are parts by weight unless otherwise stated.

EXAMPLE 1

Into a suitable reaction vessel fitted with a mechanical stirrer, heating mantle, thermometer, Dean-Stark trap and condenser containing 7.15 parts of ethylenediamine in 120 ml. of toluene, there were charged 159 parts of polybutenyl(980)succinic anhydride. The resulting mixture was then heated to reflux until the evolution and collection of water ceased. Upon cooling, 11.43 parts of furfural were added and then reflux was continued until the further collection of water had ceased. The toluene was stripped to give 172 parts of N-furfurylidene-5-polybutenyl (980) succinimidoethylamine which analyzed 1.58% nitrogen and had a base number of 0.46.

EXAMPLE 2

In the manner of Example 1, 161 parts of polybutenyl(980)succinic anhydride and 13.7 parts of 1,6-hexylmethylenediamine in 100 ml. of toluene were heated to reflux and stirred until the evolution and collection of water ceased. Upon cooling, 12.5 parts of benzaldehyde were added and reflux continued until the further evolution and collection of water had ceased. The toluene was removed to give 183 parts of N-benzylidene-6-polybutenyl-(980)succinimidohexylamine which analyzed 1.11% nitrogen and had a base number of 0.45.

EXAMPLE 3

In the manner of Example 1, 100 parts of polybutenyl-(980)succinic anhydride and 4.4 parts of ethylenediamine in 50 ml. of toluene were heated to reflux and stirred for two hours until the evolution and collection of water ceased. Upon cooling, 7.8 parts of 2-pyridinecarboxaldehyde were added and then reflux was continued for another two hours. The toluene was stripped to yield 109 parts of N-(2-picolineylidene)-2-[polybutenyl(980)succinimido]ethylamine which analyzed 1.47% nitrogen and had a base number of 0.65.

EXAMPLE 4

In the manner of Example 1, 106 parts of polybutenyl-(980)succinic anhydride and 4.8 parts of ethylenediamine in 50 ml. of toluene were heated to reflux and stirred for one and one-half hours until the evolution and collection of water ceased. Upon cooling, 14.5 parts of benzophenone were added and then reflux was continued for another two hours. Thereafter the toluene was stripped to yield 123 parts of N-diphenylmethylene-2-[polybutenyl(980)-succinimido]ethylamine which analyzed 1.44% nitrogen and had a base number of 0.51.

Additional examples of other imines of this invention and the materials used for their preparation are given in Table I, below. In the table only the alkenyl, or polyalkenyl, portion of the polyalkenylsuccinic anhydride and the average molecular weight of such portion are given, EDA means ethylenediamine and HDA means hexamethylenediamine.

a "Lacquer Deposition" test, involves passing partially oxidized gasoline through a sample of an oil formulation in a suitable container under controlled conditions, after which the sample is aged in an oven. The amount of deposit is then determined by washing away the oil. A control formulation is run simultaneously. The figure reported represents the percent reduction in deposits when a detergent is present as compared to the amount of deposit when no detergent is present. The great advantage of the Lacquer Deposition test is that the results obtained correlate well with the results which are obtained in low temperature gasoline engine tests such as the Lincoln MS Test. Utilizing the above described test, the results presented in Table II, below, were obtained using a concentration of 2% by weight of the imine tested.

TABLE II

| Test No. | Imine | Lacquer deposition |
| --- | --- | --- |
| 1 | Example 1 | 88 |
| 2 | Example 2 | 91 |
| 3 | Example 3 | 82 |
| 4 | Example 4 | 89 |

From the above, it is clear that the addition to lubricating oils of the imines of the present invention brings with it a clear improvement of the dispersing and/or detergent qualities of said oils. Nevertheless the greater part of the commercial lubricating oils sold today are subject to a large number of uses, and it is, therefore, generally necessary to employ more than one type of additive in a finished lubricant composition. Thus, although the products of the present invention are effective detergents, it is frequently necessary to use such products in combination with other types of additives, such as metal-containing detergents and/or dispersants, corrosion inhibitors, oxidation inhibitors, extreme pressure agents,

TABLE I

| Example No. | Alkenyl portion of alkenylsuccinic anhydride (mol wt. of alkenyl group) (a) | Polyethylene amine (b) | Carbonyl-containing compound (c) | Molar ratio (a):(b):(c) | Product |
| --- | --- | --- | --- | --- | --- |
| 5 | Polybutenyl (980) | EDA | Acetophenone | 1:1:1 | N-isopropylidene-N'-polybutenyl(980)-succinimidoethylenediamine. |
| 6 | do | HDA | Butyronaphthone | 1:1:1 | N-butyronaphthylidene-N'-polybutenyl(980)-succinimido-1,6-hexanediamine. |
| 7 | Polybutenyl(1350) | HDA | Acetone | 1:1:1 | N-isopropylidene-N'-polybutenyl(1350)-succinimido-1,6-hexanediamine. |
| 8 | Polybutenyl(980) | EDA | Cyclohexanone | 1:1:1 | N-cyclohexylidene-N'-polybutenyl(980)-succinimidoethylenediamine. |
| 9 | Polybutenyl (1350) | EDA | n-Butyraldehyde | 1:1:1 | N-butylidene-N'-polybutenyl(1350)-succinimidoethylenediamine. |
| 10 | Polybutenyl (980) | EDA | Formaldehyde | 1:1:1 | N-methylene-N'-polybutenyl(980)-succinimidoethylenediamine. |
| 11 | do | EDA | Acetaldehyde | 1:1:1 | N-ethylidene-N'-polybutenyl(980)-succinimidoethylenediamine. |

In a similar manner the other imines contemplated by this invention can be prepared. It is also contemplated to prepare the compounds of the present invention employing a different order of reaction than that heretofore described. By way of example this would include reacting the carbonyl-containing compound and the polyamine followed by the subsequent reaction of the intermediate product thus formed with a polyalkenylsuccinic anhydride.

The imines of this invention can be used in lubricating oils in amounts of from about 0.05% to about 25% by weight. Additive concentrates of 60-95% are also contemplated. It has been found, however, that in finished formulations, for most applications, amounts of from about 0.25% to about 10% by weight are sufficient. In addition, the compounds of this invention can be used in fuel oils and in various light products, such as gasoline, wherein they also function as detergents or dispersants.

A screening test was utilized to demonstrate the detergency effectiveness in gasoline engine oil formulations of the imines of this invention. This test, referred to as viscosity index improvers, pour-point depressors, antifoaming agents, and the like.

A particularly useful combination of additives intended to be applied in motor lubricants is the combination of an additive of the present invention and a metal-containing derivative of phosphorus such as a metal phosphorodithioate, e.g., zinc dihexyl phosphorodithioate, the zinc salt of mixed alkyl phosphorodithioates where the alkyl groups are obtained, for example, from an equal mixture of isobutyl and n-amyl alcohols, and the metal salts of phosphorus sulfide-olefin polymer reaction products and combinations thereof.

Lubricating oils which can be used as the base oils to which the new compounds of this invention are added are not limited as far as detergent effects are concerned, and, accordingly can be lubricating oils which are of a naphthenic base, paraffinic base, and other hydrocarbon bases, as well as lubricating oils derived from coal products and synthetic oils, such as alkylene polymers, alkylene oxide polymers, dicarboxylic acid esters, alkylated benzenes, silicate esters, silicon polymers, and the like, are suitable.

While this invention has been described with reference to various specific examples and embodiments, it is understood that the invention is not limited thereto and that it can be variously practiced within the scope of the following claims.

The embodiments of the invention in which an exclusive property or privilege is claimed are defined as follows:

1. A compound represented by the structure

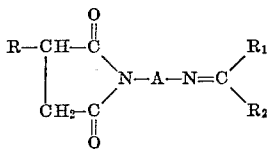

where R is a polyalkenyl radical which has an average molecular weight of from about 500 to about 2500; $R_1$ and $R_2$ are selected from the group consisting of hydrogen, alkyl, alkenyl and haloalkyl radicals containing from one to twenty carbon atoms, and a phenyl, a naphthyl and a furfuryl radical; and A is selected from the group consisting of (I) $(CH_2)_x$ (II) $(NH)_n - \overset{Z}{\underset{\|}{C}} - (NH)_w$ and (III) $\overset{Z}{\underset{\|}{C}} - NH - \overset{Z}{\underset{\|}{C}}$ in which in (I) $x$ is a whole number from one to six; in (II) $n$ is an integer from 0 to 1, $w$ is an integer from 0 to 1, but the sum of $n$ and $w$ is from 1 to 2, Z is selected from the group consisting of oxygen and NH; and in (III) Z is selected from the group consisting of oxygen and NH but at least one Z is NH.

2. A compound of claim 1 where R is polybutenyl of an average molecular wieght of from about 800 to about 1500.

3. A compound of claim 1 where R is polybutenyl of an average molecular weight of from about 800 to about 1500, $R_1$ is hydrogen, $R_2$ is a phenyl radical and A is $(CH_2)_x$.

4. A compound of claim 1 where R is polybutenyl of an average molecular weight of from about 800 to about 1500, $R_1$ is hydrogen, $R_2$ is alkyl and A is $(CH_2)_x$.

5. A compound of claim 1 where R is polybutenyl of an average molecular weight of from about 800 to about 1500, A is $(CH_2)_x$ and $x$ is six.

6. N-benzylidene-6 - polybutenylsuccinimidohexylamine in which the polybutenyl group has an average molecular weight of about 1000.

7. N-benzylidene - 6 - polybutenylsuccinimidohexylamine in which the polybutenyl group has an average molecular weight of about 1300.

8. N-furfurylidene - 5 - polybutenylsuccinimidoethylamine in which the polybutenyl group has an average molecular weight of about 1000.

9. N-(2-picolineylidene)-2 - (polybutenylsuccinimido)-ethylamine in which the polybutenyl group has an average molecular weight of about 1000.

10. N - diphenylmethylene - 2 - (polybutenylsuccinimido)-ethylamine in which the polybutenyl group has an average molecular weight of about 1000.

11. N - isopropylidene - N' - polybutenylsuccinimidoethylamine in which the polybutenyl group has an average molecular weight of about 1000.

12. A composition comprising a major amount of a lubricating oil and from about 0.05% to about 25% by weight of a compound of claim 1.

13. A composition comprising a major amount of a lubricating oil and from about 0.05% to about 25% by weight of a compound of claim 3.

14. A composition comprising a major amount of a lubricating oil and from about 0.05% to about 25% by weight of a compound of claim 4.

15. A composition comprising a major amount of a lubricating oil and from about 0.05% to about 25% by weight of a compound of claim 6.

16. A composition comprising a major amount of a lubricating oil and from about 0.05% to about 25% by weight of a compound of claim 7.

17. A compound having the structural formula:

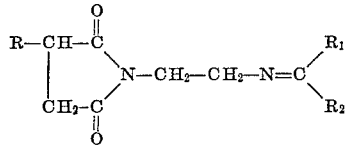

where R is a polyalkenyl group having a molecular weight of about 940 and $R_1$ and $R_2$ are selected from the group consisting of hydrogen, alkyl and phenyl.

18. A composition which comprises a major amount of a substance selected from the group consisting of lubricating oils and normally liquid hydrocarbon fuels and a minor amount, sufficient to impart dispersancy, of a compound having the structural formula:

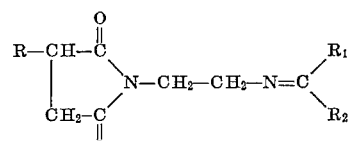

where R is a polyalkenyl group having a molecular weight of about 940 and $R_1$ and $R_2$ are selected from the group consisting of hydrogen, alkyl and phenyl.

19. A compound having the structural formula:

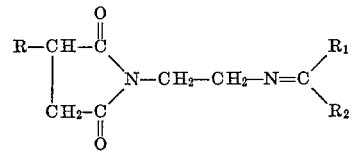

where R is a polyalkenyl group having a molecular weight of from about 500 to about 1800 and $R_1$ and $R_2$ are selected from the group consisting of hydrogen, alkyl and phenyl.

20. A composition which comprises a major amount of a substance selected from the group consisting of lubricating oils and normally liquid hydrocarbon fuels and a minor amount, sufficient to impart dispersancy, of a compound having the structural formula:

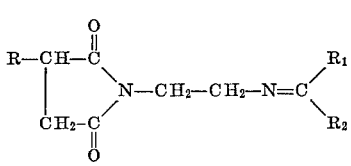

where R is a polyalkenyl group having a molecular weight of from about 500 to about 1800 and $R_1$ and $R_2$ are selected from the group consisting of hydrogen, alkyl and phenyl.

References Cited
UNITED STATES PATENTS

| | | | |
|---|---|---|---|
| 2,279,561 | 4/1942 | Dietrich | 252—50 |
| 2,409,799 | 10/1946 | Roberts | 252—50 X |
| 3,087,936 | 4/1963 | Le Suer | 252—51.5 |
| 3,131,150 | 4/1964 | Stuart et al. | 252—51.5 |

PATRICK P. GARWIN, Primary Examiner

U.S. Cl. X.R.

44—63; 260—326.5